(12) United States Patent
Galloway et al.

(10) Patent No.: US 11,626,766 B2
(45) Date of Patent: Apr. 11, 2023

(54) POWER CONNECTION WITH OVERMOLDED AXIALLY ADJUSTED CONNECTING RINGS

(71) Applicant: Hitachi Automotive Systems, Ltd., Ibaraki (JP)

(72) Inventors: Joseph William Galloway, Ibaraki (JP); Shinji Yamazaki, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 407 days.

(21) Appl. No.: 16/881,142

(22) Filed: May 22, 2020

(65) Prior Publication Data

US 2021/0367474 A1    Nov. 25, 2021

(51) Int. Cl.
| | |
|---|---|
| *H02K 3/52* | (2006.01) |
| *H02K 1/14* | (2006.01) |
| *H02K 3/28* | (2006.01) |
| *H02K 15/00* | (2006.01) |
| *H02K 15/10* | (2006.01) |
| *H02K 5/22* | (2006.01) |

(52) U.S. Cl.
CPC ............ *H02K 3/521* (2013.01); *H02K 1/148* (2013.01); *H02K 3/28* (2013.01); *H02K 5/22* (2013.01); *H02K 15/0062* (2013.01); *H02K 15/10* (2013.01); *H02K 2203/09* (2013.01)

(58) Field of Classification Search
CPC .... H02K 1/148; H02K 15/0062; H02K 15/10; H02K 3/28; H02K 3/521; H02K 5/22
See application file for complete search history.

(56) References Cited

U.S. PATENT DOCUMENTS

| | | | |
|---|---|---|---|
| 6,034,460 A | 3/2000 | Tajima et al. | |
| 6,600,244 B2* | 7/2003 | Okazaki ................. | H02K 3/522 310/71 |
| 7,851,955 B2 | 12/2010 | Yamamoto et al. | |
| 7,948,130 B2* | 5/2011 | Kitagawa ............... | H02K 3/522 310/71 |

(Continued)

FOREIGN PATENT DOCUMENTS

| | | |
|---|---|---|
| EP | 1988619 A1 | 11/2008 |
| EP | 2063516 B1 | 7/2015 |
| JP | 2005086985 A | 3/2005 |

*Primary Examiner* — Ahmed Elnakib
*Assistant Examiner* — Leda T Pham
(74) *Attorney, Agent, or Firm* — Mattingly & Malur, PC

(57) ABSTRACT

In some examples, a connecting ring may connect to a stator coil. The connecting ring may include at least one linear conductor integrally formed in a ring-like shape. Further, the connecting ring may include a terminal section integrally formed in the linear conductor, the terminal section including a hole configured to receive a wire end of the stator coil inserted into the hole in an insertion direction. In addition, the connecting ring may include a cylindrical protrusion having an opening in communication with the hole. The cylindrical protrusion may protrude away from the hole in the insertion direction. Additionally, the connecting ring may include bends for raising a first portion of the connecting ring including the terminal section in the insertion direction relative to a second portion of the connecting ring. An insulating member may cover the second portion of the connecting ring.

17 Claims, 13 Drawing Sheets

(56) References Cited

U.S. PATENT DOCUMENTS

| | | | |
|---|---|---|---|
| 7,952,245 B2 * | 5/2011 | Ueda | H02K 3/522 310/71 |
| 8,922,079 B2 | 12/2014 | Egami et al. | |
| 2003/0173842 A1 | 9/2003 | Kobayashi et al. | |
| 2004/0070293 A1 | 4/2004 | Kabasawa et al. | |
| 2020/0153307 A1 | 5/2020 | Abdallah et al. | |

* cited by examiner

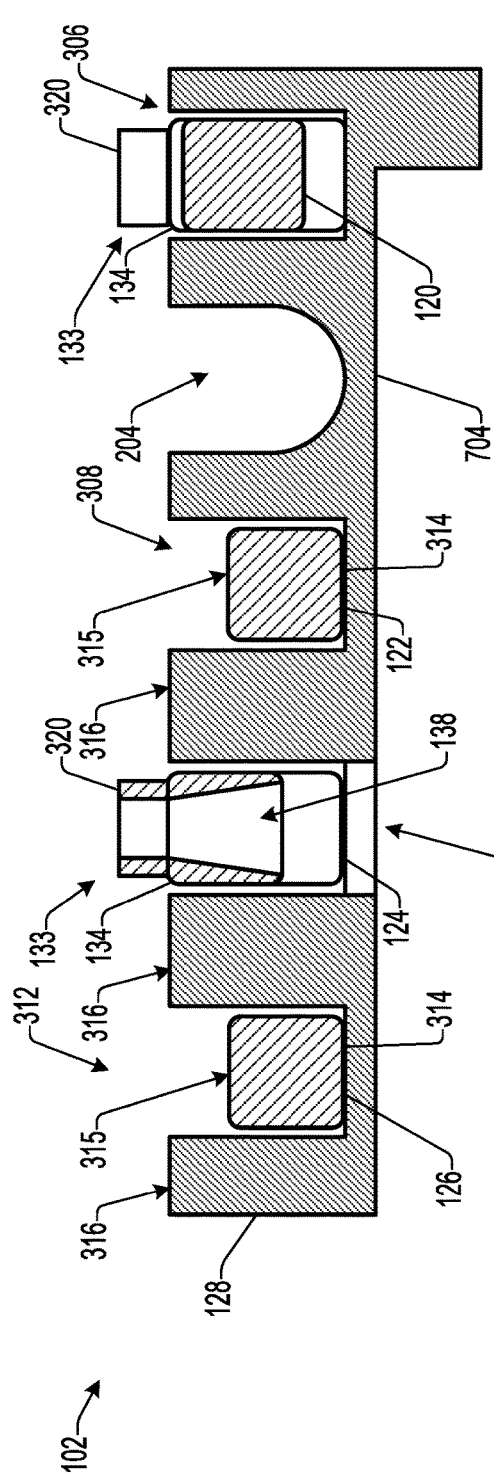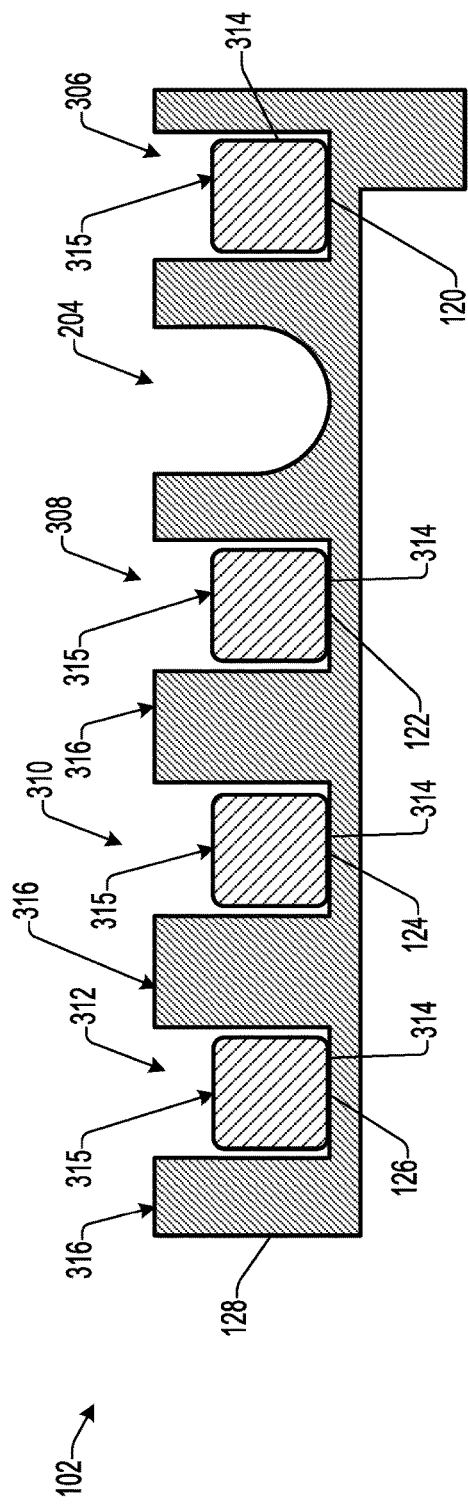

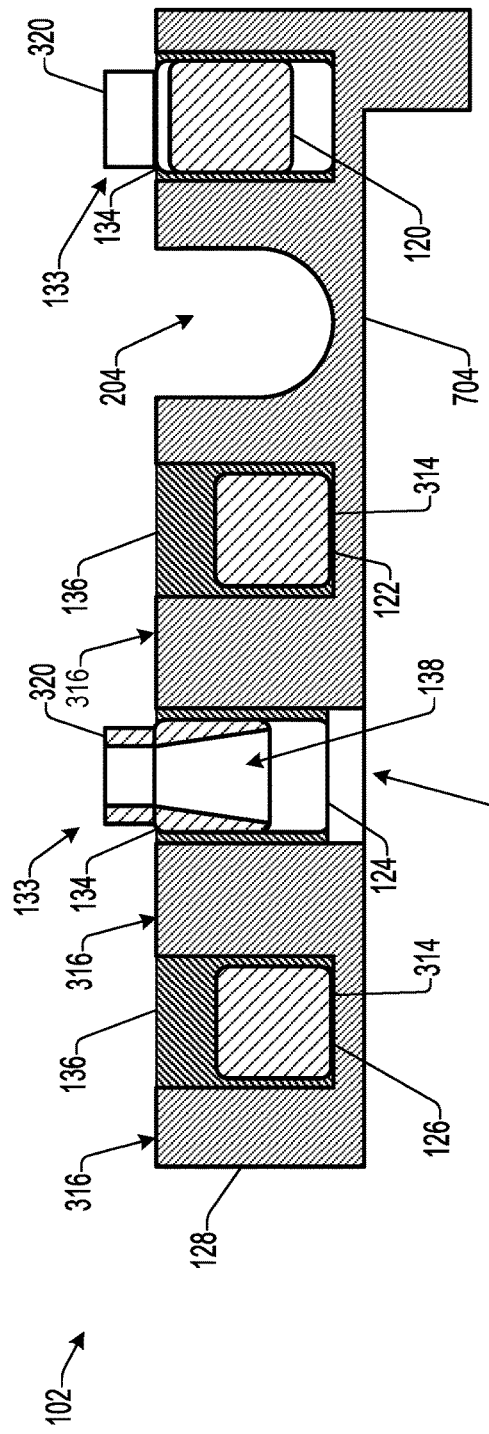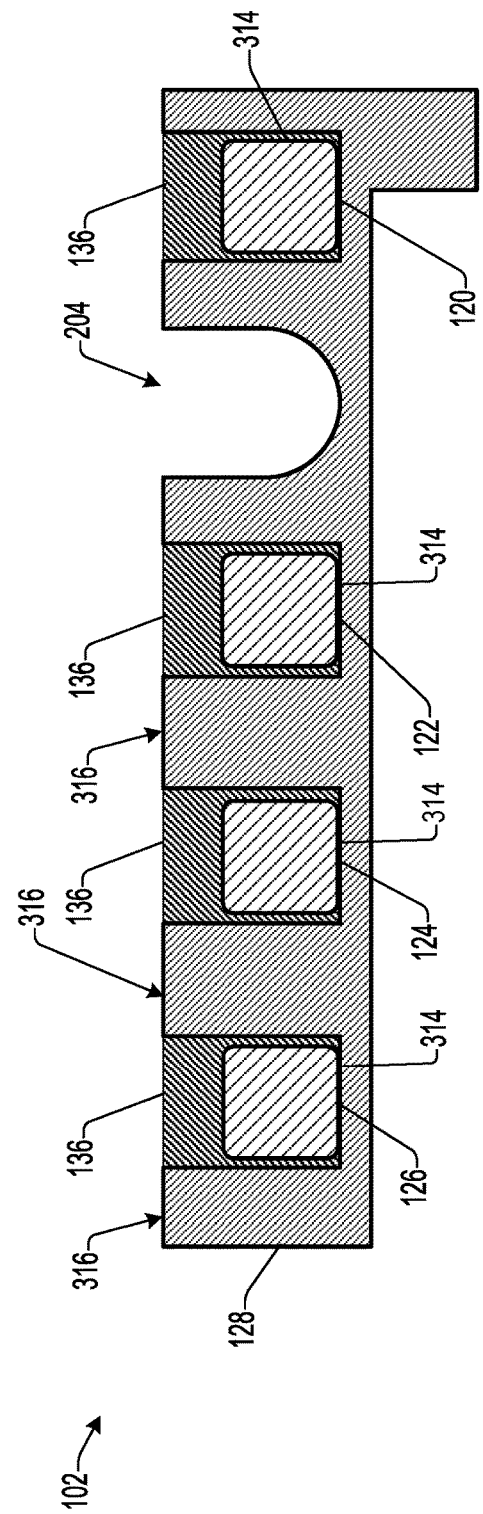

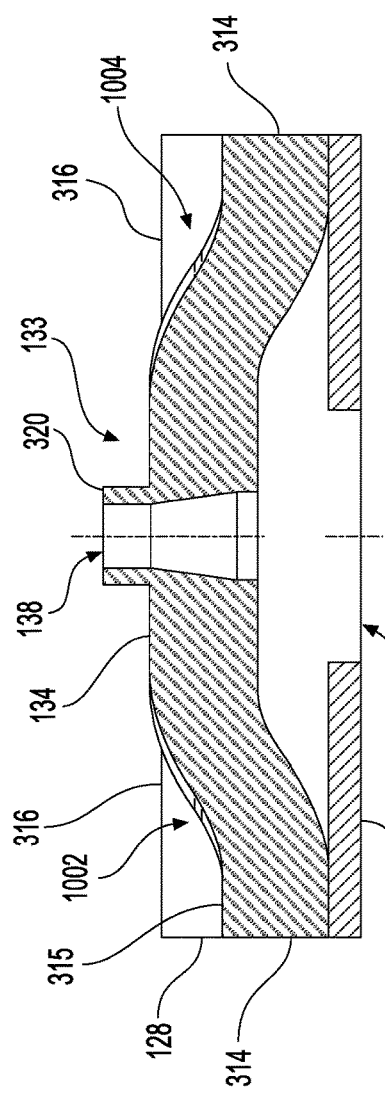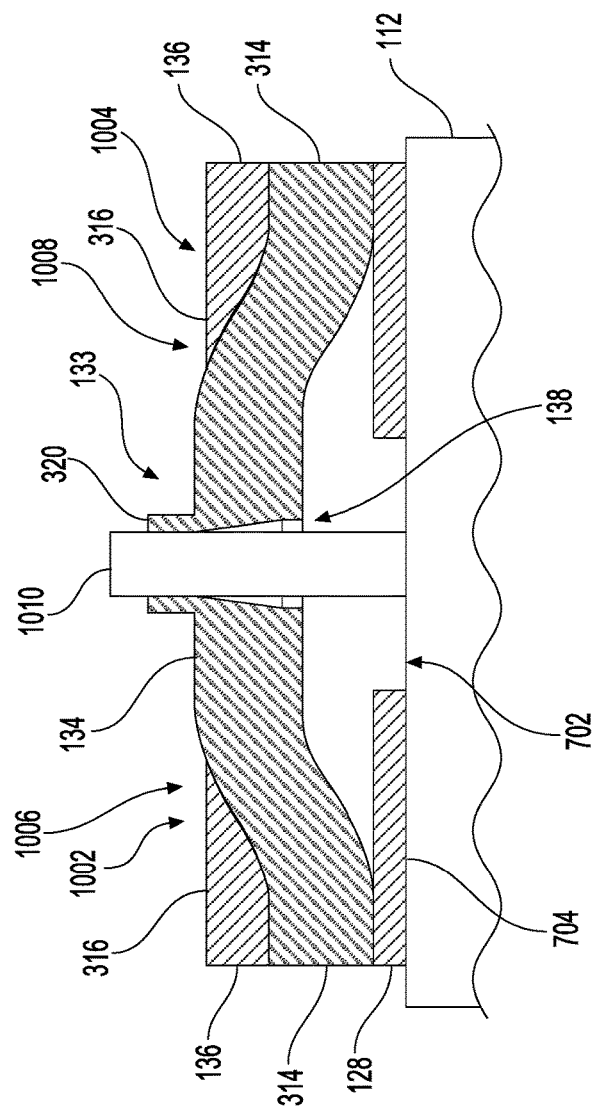

11,626,766 B2

POWER CONNECTION WITH OVERMOLDED AXIALLY ADJUSTED CONNECTING RINGS

BACKGROUND

Power distribution for a rotary electric machine, such as an electric motor or generator, may include multiple phases. For example, in a three-phase stator, three conductors may each carry an alternating current of similar frequency and current amplitude relative to a common reference, but with a phase difference of one third of a cycle between each of the three conductors. A fourth conductor, called the neutral conductor, may serve as the common reference, such as for star-connection type motors. Three-phase systems can produce a rotating magnetic field with a specified direction and speed. For example, the rotating magnetic field may be used to produce torque, such as when coupled with a rotor that includes a permanent magnet. However, manufacturing and assembling a power distributing apparatus for a rotary electric machine can be challenging. One example of an existing technique is set forth in U.S. Pat. No. 7,952,245, to Ueda et al., which is incorporated herein by reference.

SUMMARY

Some implementations include arrangements and techniques for a power connection apparatus that includes a connecting ring that may connect to a stator coil. The connecting ring may include at least one linear conductor integrally formed in a ring-like shape. Further, the connecting ring may include a terminal section integrally formed in the linear conductor, the terminal section including a hole configured to receive a wire end of the stator coil inserted into the hole in an insertion direction. In addition, the connecting ring may include a cylindrical protrusion having an opening in communication with the hole. The cylindrical protrusion may protrude away from the hole in the insertion direction. Additionally, the connecting ring may include bends for raising a first portion of the connecting ring including the terminal section in the insertion direction relative to a second portion of the connecting ring. An insulating member may cover the second portion of the connecting ring.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 7A illustrates an example cross-sectional view of the power connecting apparatus prior to performing the overmolding operation, as taken along line 7A-7A of FIG. 6, according to some implementations.

FIG. 7B illustrates an example cross-sectional view of the power connecting apparatus prior to performing the overmolding operation, as taken along line 7B-7B of FIG. 6, according to some implementations.

FIG. 9A illustrates an example cross-sectional view of the power connecting apparatus following the overmolding operation, as taken along line 9A-9A of FIG. 8, according to some implementations.

FIG. 9B illustrates an example cross-sectional view of the power connecting apparatus following the overmolding operation, as taken along line 9B-9B of FIG. 8, according to some implementations.

FIG. 10A illustrates an example cross-sectional view of a terminal section of the power connecting apparatus prior to performing the overmolding operation, as taken along line 10A-10A of FIG. 6, according to some implementations.

FIG. 10B illustrates an example cross-sectional view of a terminal section of the power connecting apparatus 102 following the overmolding operation, as taken along line 10B-10B of FIG. 8, according to some implementations.

DETAILED DESCRIPTION

Figure 1:
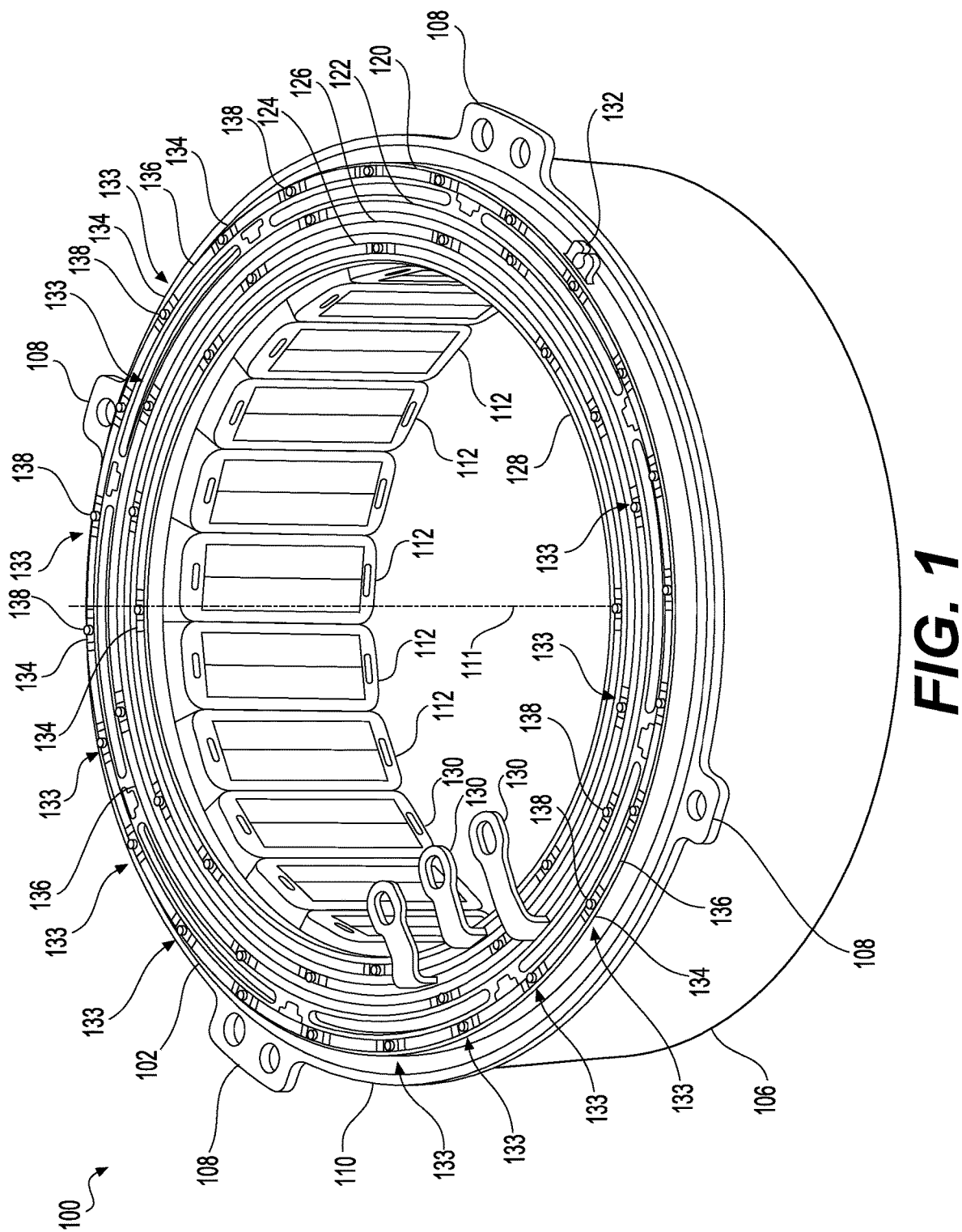
FIG. 1 illustrates a perspective view of a stator for a rotary electric machine having a power distribution apparatus according to some implementations.

The technology herein includes arrangements and techniques for a power connecting apparatus for a multiple-phase rotary electric machine. For instance, some examples herein include a power connecting apparatus that includes a plurality of shaped connecting rings that each include multiple bends to provide a plurality of raised portions. Each raised portion includes a through-hole for receiving a respective coil wire extending upward from the stator coil assembly. The connecting rings are mounted concentrically within respective grooves in a generally flat circular carrier ring. Following an overmolding procedure, the raised portions of the connecting rings may remain exposed to enable welding and other assembly procedures, while remaining portions of the connecting rings are overlaid or otherwise covered within the grooves by an over-molded insulating material that secures and insulates the connecting rings within their respective grooves in the carrier ring.

Some examples herein include a carrier ring within which four connecting rings may be disposed (e.g., a U-phase connecting ring, a V-phase connecting ring, a W-phase connecting ring, and a neutral connecting ring). The three-phase connecting rings may each include a respective power terminals extending upward from a first (upper) side of the carrier ring to provide a raised portion at each terminal. An insulating material may be inlaid or otherwise overmolded on the first side of the carrier ring to secure each connecting ring within the carrier ring, while leaving the raised portions of the connecting rings at least partially exposed. Accordingly, the assembled power distribution apparatus including the overmolded carrier ring may simplify the connection structure for connecting the carrier ring to the stator coils as compared to conventional techniques by providing a singular assembly for assembly to the stator coils.

The connecting rings herein may be formed from an elongated copper wire conductor having a rectangular cross section (in the examples herein the term "rectangular" encompasses "square") formed into a ring shape. As mentioned above, the raised portions of the connecting rings may each include a through-hole that remains exposed following the overmolding procedure for subsequent processing in the manufacturing process. For example, the raised portions are raised in an axial direction of the stator corresponding to a centerline of the stator and further corresponding to the axis of rotation of a rotor that may be assembled with the stator during a later assembly operation. For instance, the raised portions of the connecting rings enable subsequent trimming and welding of stator coil wires to the connecting rings at the raised portions, while maintaining electrical insulation of the remaining portions connecting rings.

As one example, when the power connecting apparatus is assembled to the stator coils, wire ends of the stator coils are able to be inserted into the through-holes of the raised portions during assembly of the connecting rings to the stator for forming electrical contacts between the wire ends and the respective connecting rings. The stator coil wire ends may further be secured within the respective through-holes of the respective connecting rings, such as by welding, soldering, brazing, crimping, or the like, which may be applied to a portion of the wire ends adjacent to an upper side opening of each raised portion of each respective connecting ring. Accordingly, implementations herein provide access to a plurality of the through-hole portions of each connecting ring while also allowing for the overmolded insulating material to be applied in advance over the remaining areas of the connecting rings to insulate and secure the connecting rings in their respective grooves within the carrier ring prior to the assembly of the power connecting apparatus to the stator coils.

Implementations herein provide a solution that simplifies the power connecting apparatus for the stator coils, allowing the power connecting apparatus to be provided as a single unitary assembly, rather than procuring the various components individually from multiple separate suppliers and using conventional multistep techniques for assembly to the stator coils. Therefore, the subsequent assembly of the power connecting apparatus to the stator coils may be simpler and more efficient than the conventional techniques, and may reduce the number of suppliers and/or assembly operations for producing the finished stator assembly.

The multiple connecting rings may be assembled into and supported in respective grooves in the carrier ring. For example, the carrier ring may be constructed of an insulative, dielectric, or otherwise non-conductive material, such as polyphenylene sulfide, or other polymers, monomers, or the like. As one example, the carrier ring may be insert molded around the connecting rings such that the connecting rings and the carrier ring form an integrated connecting ring assembly in which the connecting rings are partially embedded in the carrier ring. Holes may be formed in the carrier ring under the connecting rings, and may align with the through-holes in the raised portions of the connecting rings to enable insertion of the stator coil wire ends through the holes in the carrier ring and into the through-holes in the connecting rings. With the carrier ring and the connecting rings assembled as a single integrated power connecting apparatus, the sizing and location of the holes in the carrier ring in cooperation with the through-holes in the raised portions of the connecting rings enables the power connecting apparatus to be assembled onto and engaged with the wire ends of the stator coils in a single step.

The stator in some examples herein may include a plurality of individual stator coils arranged in a circular configuration. Each stator coil may include two protruding wire ends extending upwards. When the connecting ring assembly is assembled to the plurality of stator coils, one of the wire ends of each stator coil may be connected to a neutral connecting ring and the other one of the wire ends may be connected to a connecting ring corresponding to one of the three phases (in the case of a three phase rotary machine with star-connection). Thus, the connecting ring assembly disclosed herein enables simplified assembly of the connecting ring assembly to the stator coil wire ends by enabling the wire ends to be placed into contact with their respective intended connecting rings of the four connecting rings in a single assembly step.

Some implementations herein may be used to terminate a stator featuring a connection-wound winding pattern, such as a concentrated-wound stator. For instance, the solution herein provides a low height profile to help minimize the overall height of the assembled stator, which in turn helps minimized the overall packaging size of the assembled rotary machine. Further, implementations herein are highly scalable and may be used with different sizes of stators. In addition, examples herein may accommodate different sizes of wires and terminal positions, and different numbers of coils with some slight adjustment, while maintaining the same core design. The implementations herein simplify the assembly process, reduce assembly time, and eliminate machining operations and complex assembly steps used in existing designs. The connecting rings herein may also require fewer steps in forming and machining as compared to existing designs.

For discussion purposes, some example implementations are described in the environment of a three-phase electric motor. However, implementations herein are not limited to the particular examples provided, and may be extended to other service environments, other types of rotary electrical machines, or the like, as will be apparent to those of skill in the art in light of the disclosure herein. For instance, while the power connecting apparatus disclosed herein may be employed in a concentrated-winding stator for a three-phase brushless permanent magnet motor useable in a vehicle, or the like, implementations herein are not limited to such use, but may also be used in an induction motor, other types of electric motors, generators, alternators, dynamos, or in various other rotary electric machines. In addition, while concentrated winding is described and illustrated in some examples, implementations herein may additionally or alternatively be used with distributed winding patterns or other types of winding, coil and conductor arrangements. Accordingly, implementations herein are not limited to the particular winding, coil and conductor configurations described in the examples.

FIG. 1 illustrates a perspective view of a stator 100 for a rotary electric machine having a power distribution apparatus 102 according to some implementations. In this example, the stator 100 may be for a rotary electric machine, such as a three-phase electric motor, although examples herein are not limited to such, as discussed above. The stator 100 may be of a concentrated winding type intended for use in restricted spaces. The rotary electric machine may typically include a rotor (not shown in FIG. 1) that may include one or more permanent magnets that may be driven by an alternating current in the stator 100 as is known in the art.

The stator 100 may include a housing 106 that includes a plurality of mounting tabs 108 along a flange 110 for mounting the stator 100 to a fixed support, fixture, mounting surface, or the like (not shown). As is known in the art, the rotor, when installed in the stator 100 is rotatable relative to the stator 100 around a central axis of rotation, which is also the central axis 111 of the stator 100, such as when electric current is supplied to the stator 100 through the power connecting apparatus 102. For instance, the stator 100 may be supplied with electric power to drive a vehicle (not shown) or to supplementarily assist an internal combustion engine (not shown). In addition, if the rotor is driven mechanically, such as when a vehicle is slowing down or in the case that the rotary electric machine is an alternator, the stator 100 may be used to convert a portion of the kinetic energy to electric power, such as while assisting in slowing the vehicle.

In the illustrated example, the stator 100 may be configured for use with a three-phase alternating current (AC). For instance, an inverter (not shown) may receive high-voltage direct current (DC) from a battery (not shown) and may convert the DC current to three-phase AC power. A plurality of stator coils 112 are included in the stator 100 and arranged in a circular configuration around the central axis 111. The stator coils 112 may be connected with the power connecting apparatus 102, as described additionally below, so that individual ones of the stator coils 112 correspond to one of the three phases, i.e., a U-phase, a V-phase, or a W-phase, in a successive pattern, e.g., U, V, W, U, V, W, and so forth.

As described additionally below with respect to FIG. 12, the stator coils 112 may each include a length of a conductor, such as a wire, wound multiple times around a core to provide an electromagnetic effect when electric current passes through the conductor. The conductor may be insulated, such as with an enamel coating or other suitable insulator, to prevent short-circuiting between the windings within the stator coil 112. The plurality of stator coils 112 may be pressed, shrunk fit, or otherwise adhered to the stator housing 106 to form the stator 100 as a hollow cylinder. In the illustrated example, there are 24 stator coils 112, and therefore, 8 stator coils 112 are designated for U-phase power, 8 stator coils 112 are designated for V-phase power, and 8 stator coils 112 are designated for W-phase power. Of course, more or fewer stator coils 112 may be used in other examples.

The power connecting apparatus 102 may include four connecting rings, namely a neutral (N) connecting ring 120, a U-phase connecting ring 122, a V-phase connecting ring 124, and a W-phase connecting ring 126. The connecting rings 120-126 may be disposed in a carrier ring 128, as discussed additionally below, to form the power connecting apparatus 102. Implementations herein are not limited by the order of the location of the connecting rings 120-126 from the axis of rotation 111.

As illustrated and described additionally below, each stator coil 112 includes a first end wire that connects to the N connecting ring 120 and a second end wire that connects to one of the U, V, or W connecting rings 122, 124, or 126, respectively (the end wires are not visible in FIG. 1). As mentioned above, the connections are in sequence around the circumference of the stator 100, e.g., U, V, W, U, V, W, and so forth. Accordingly, when three-phase power is supplied to the power connecting apparatus 102, the alternating phases supplied successively to the respective stator coils 112 cause the rotor to rotate around the axis of rotation 111.

In addition, each of the U, V and W-phase connecting rings 122, 124, and 126, respectively, of the power connecting apparatus 102 includes a respective power terminal 130 for connecting to cables, a wiring harness, a power source, a battery, an invertor, a rectifier, or the like. As discussed additionally below, e.g., with respect to FIG. 4, the power terminals 130 may be connected to the connecting rings 122-126 using any suitable technique, such as welding, brazing, soldering, mechanical fastening, combinations thereof, or the like. In addition, the carrier ring 128 in this example includes a lug 132 that may be used for securing a wire for a thermistor (not shown in FIG. 1), or the like, for monitoring a temperature associated with the stator 100 during use.

Furthermore, each of the connecting rings 120-126 includes a plurality of stator-wire-receiving terminal sections 133 formed at raised portions 134 of the connecting rings 120-126. For example, the raised portions 134 may be physically and electrically exposed, while a remaining portion of each connecting ring 120-126 is covered with an overmolded insulating member 136, such as a layer of insulating material molded or otherwise overlaid on the remaining (unraised) portion of the connecting rings 120-126. Each terminal section 133 at each raised portion 134 includes a through-hole 138 that may receive one of the wire ends (not visible in FIG. 1) from one of the stator coils 112. As discussed additionally below, when the power connecting apparatus 102 has been assembled to the stator 100, and the respective wire ends of the stator coils 112 inserted into the respective through-holes 138. Following insertion, the wire ends may be crimped, trimmed and subsequently welded, brazed, soldered, or otherwise fastened in place to ensure electrical contact is maintained between the respective coils 112 and the respective connecting rings 120-126.

In some examples, following assembly of the power connecting apparatus 102 to the stator 100, a ring-shaped cover or the like (not shown in FIG. 1) may be placed over the power connecting apparatus 102. For instance, the cover may protect the terminal sections 133 of the connecting rings 120-126 and may electrically insulate and protect the power connecting apparatus 102 from possible contact with external objects.

Figure 2:
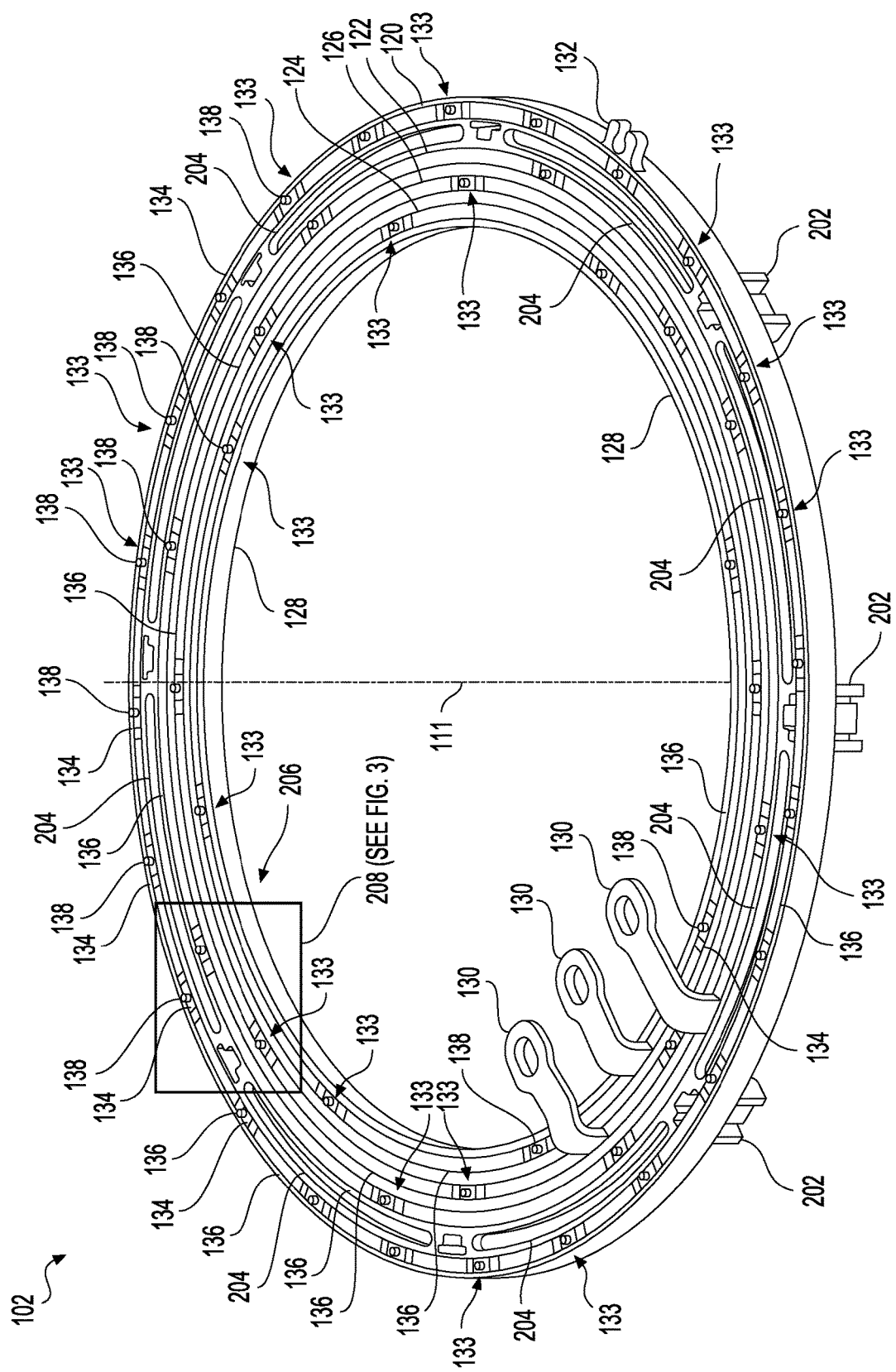
FIG. 2 illustrates a perspective view of the power connecting apparatus according to some implementations.

FIG. 2 illustrates a perspective view of the power connecting apparatus 102 according to some implementations. In the illustrated example, the power connecting apparatus 102 is shown prior to installation onto the stator 100 as shown in FIG. 1. The carrier ring 128 may include a plurality of alignment tabs 202 extending downward for enabling proper alignment of the power connecting apparatus 102 during assembly to the stator 100. For example, the alignment tabs 202 may be inserted into corresponding mating holes (not shown in FIG. 2) located in the housing 106 around the perimeter of the stator coils 112. Further, the carrier ring 128 may include a series of peripheral grooves 204 located between the neutral connecting ring 120 and the U-phase connecting ring 122, with respective ones of the alignment tabs 202 located between respective sets of grooves 204. An enlarged detail view of a portion 206 of the power connecting apparatus 102 is illustrated in FIG. 3, as indicated by box 208.

Figure 3:
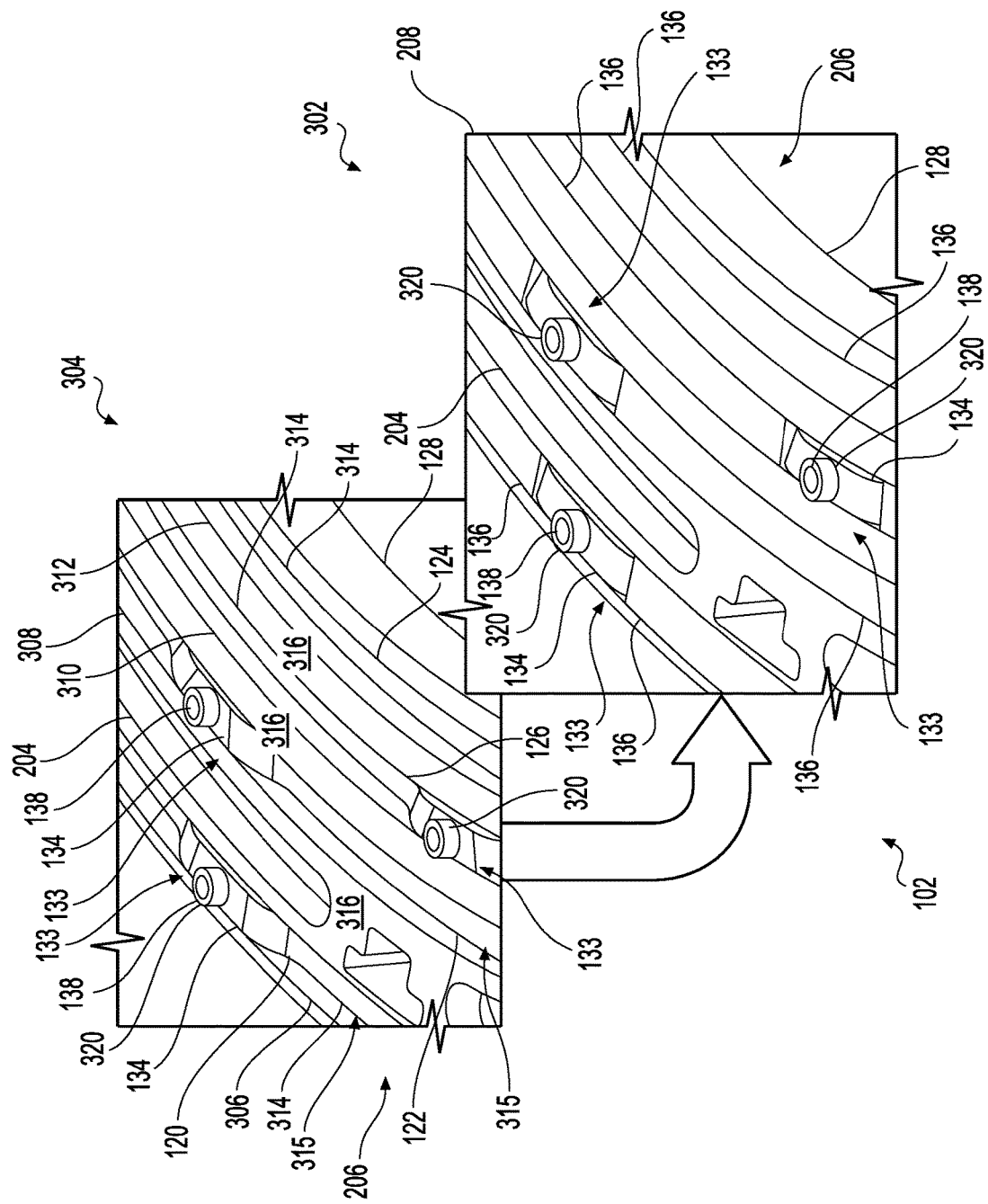
FIG. 3 illustrates an enlarged view of a portion of the power connecting apparatus according to some implementations.

FIG. 3 illustrates an enlarged view of a portion 206 of the power connecting apparatus 102, as indicated by the box 208 of FIG. 2, according to some implementations. A first view 302 of the portion 206 of the power connecting apparatus 102 inside the box 208 is shown with the overmolded insulating members 136 disposed on the carrier ring 128, while a second view 304 of the portion 206 shows the carrier ring 128 prior to the overmolded insulating members 136 being added to the power connecting apparatus 102. In the view 304, a plurality of grooves 306-312 for receiving the connecting rings 120-126 are illustrated including a first groove 306 for receiving the N connecting ring 120, a second groove 308 for receiving the U-phase connecting ring 122, a third groove 310 for receiving the V-phase connecting ring 126, and a fourth groove 312 for receiving the W-phase connecting ring 124. For example, each connecting ring 120-126 may include a non-raised lower portion 314 that fits fully within the respective groove 308-312 such that the upper surface 315 of the lower portion 314 of the connecting ring is below an upper surface 316 of the carrier ring 128 to enable the portions of the grooves 306-312 included in the lower portions 314 of the connecting rings 120-126 to be filled with the insulating members 136, as shown in the view 302.

This example illustrates three terminal sections 133, including a terminal section 133 in the N connecting ring 120, a terminal section 133 in the U-phase connecting ring 122, and a terminal section 133 in the V-phase connecting ring 124. As mentioned above, each of the phase power connecting rings 122-126 may include 8 terminal sections 133 in some examples, while the N connecting ring 120 may include 24 terminal sections 133 in some examples. Each terminal section 133 includes a respective raised portion 134, including a through-hole 138. In addition, in some examples, and upwardly extending cylindrical protrusion 320 may extend upwardly the from the through-hole 138 for extending the through-hole 138. As one example, after an end wire of a stator coil is inserted into the through-hole 138, the cylindrical protrusion 320 may be crimped around the end wire, the end wire may be trimmed close the top of the cylindrical protrusion 320, and a welding, soldering, brazing, etc., operation may be performed at each terminal section 133 during assembly of the power connecting apparatus 102 to the stator 100 to retain the wire and ends in the respective terminal sections 133.

Figure 4:
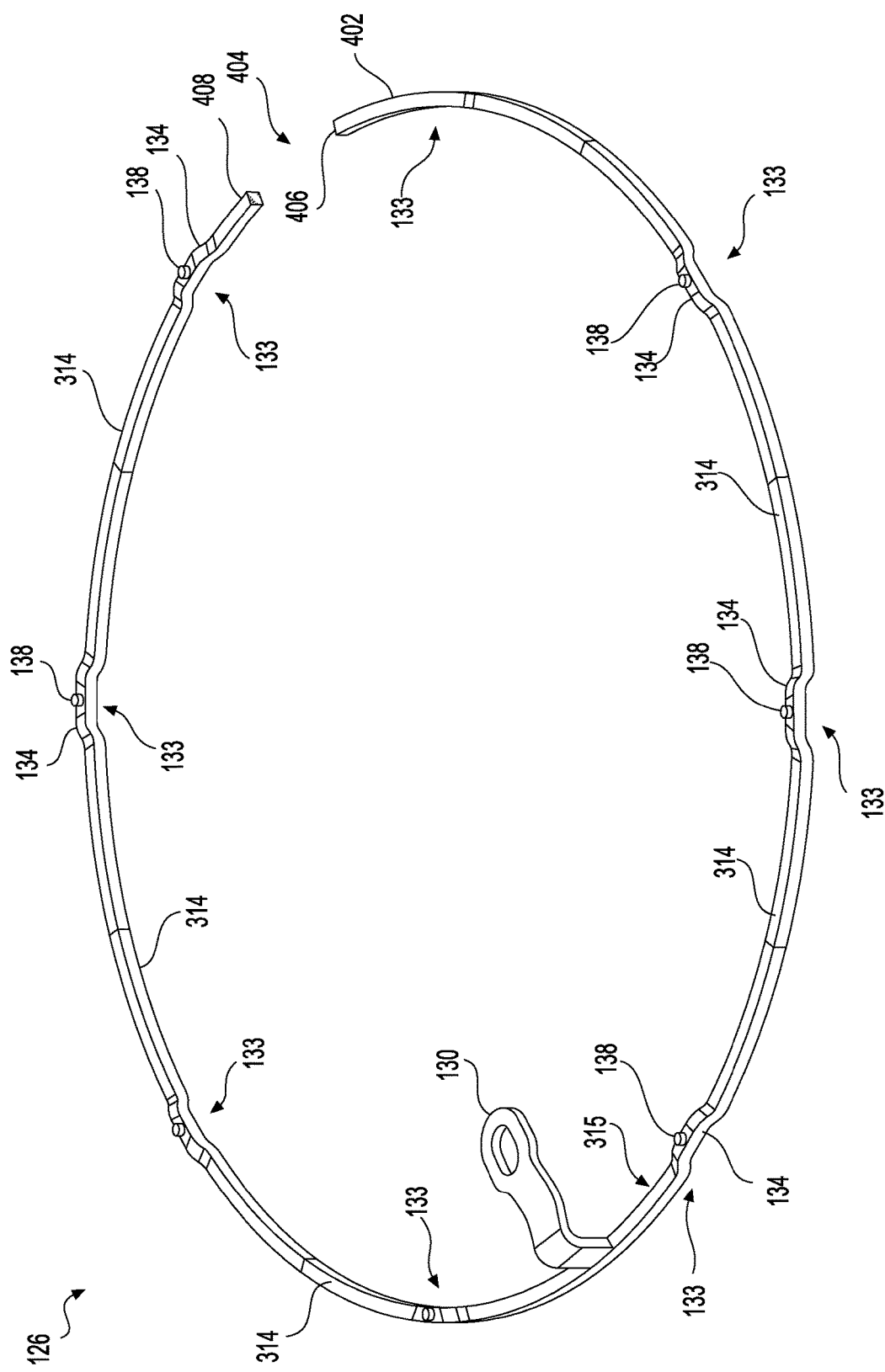
FIG. 4 illustrates a perspective view of the W-phase connecting ring according to some implementations.

FIG. 4 illustrates a perspective view of the W-phase connecting ring 126 according to some implementations. Furthermore, while the W-phase connecting ring 126 is illustrated in FIG. 4, the U-phase connecting ring 122 and the V-phase connecting ring 124 may include a similar construction, but with slightly differently positioned terminal sections 133 and/or power terminals 130. The connecting ring 126 includes a single conductor 402 (i.e., a linear conductor, such as a wire) which may have a rectangular cross section or other suitable shape. In addition, the connecting ring 126 includes an electrical break 404, such as a gap between the two ends 406 and 408 of the linear conductor 402. For example, the electrical break 404 can help prevent loss-inducing current from occurring in the connecting ring 126 when the stator is energized.

In addition, as discussed above, the connecting ring 126 includes a plurality of non-raised lower portions 314 located in between the raised portions 134 that make up the terminal sections 133. Accordingly, as mentioned above, the lower portions 314 may fit within the grooves of the carrier ring 128 while the raised portions 134 may extend up to or above the upper surface of the carrier ring 128 (not shown in FIG. 4).

Furthermore, the example of FIG. 4 illustrates the power terminal 130 connected to the upper surface 315 of the connecting ring 126. For instance, the power terminal 130 may be connected to the upper surface 315 of the connecting ring 126 such as by welding, brazing, soldering, mechanical fastener, combinations thereof, or the like. In some examples, the linear conductor 402 may be constructed of copper or other suitable conductive material.

Figure 5:
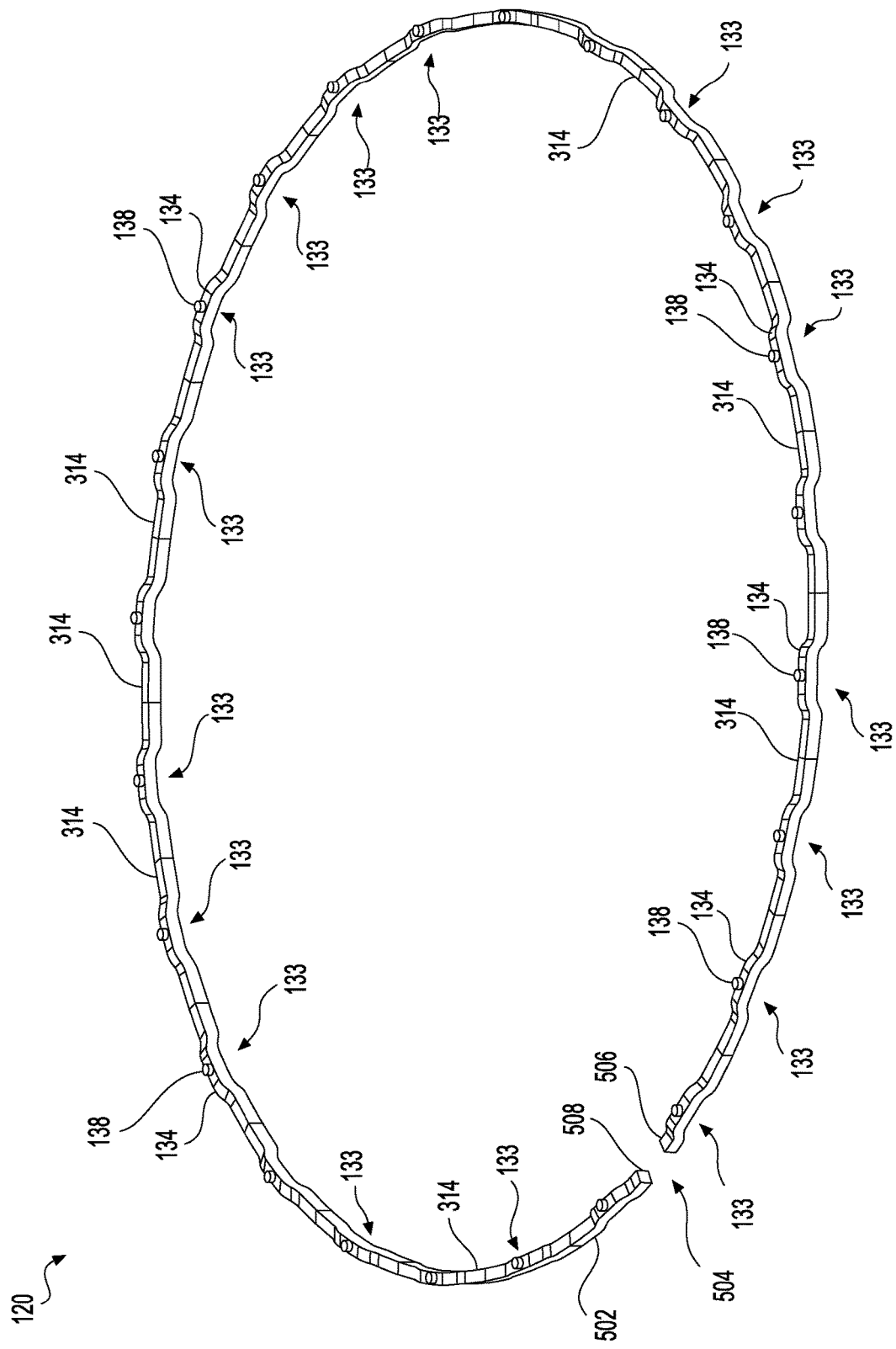
FIG. 5 illustrates a perspective view of the N connecting ring according to some implementations.

FIG. 5 illustrates a perspective view of the N connecting ring 120 according to some implementations. The N connecting ring 120 includes a single conductor 502 (i.e., a linear conductor, such as a wire) which may have a rectangular cross section or other suitable shape. In addition, the connecting ring 120 includes an electrical break 504, such as a gap between the two ends 506 and 508 of the linear conductor 502. For example, the electrical break 504 can help prevent a circumferential current from occurring in the N connecting ring 120 when the stator is energized.

In addition, as discussed above, the connecting ring 120 includes a plurality of non-raised lower portions 314 located in between the raised portions 134 that make up the terminal sections 133. Accordingly, as mentioned above, the lower portions 314 may fit within the grooves of the carrier ring 128 while the raised portions 134 may extend up to or above the upper surface of the carrier ring 128 (not shown in FIG. 5). In some examples, the linear conductor 502 may be constructed of copper or other suitable conductive material.

Figure 6:
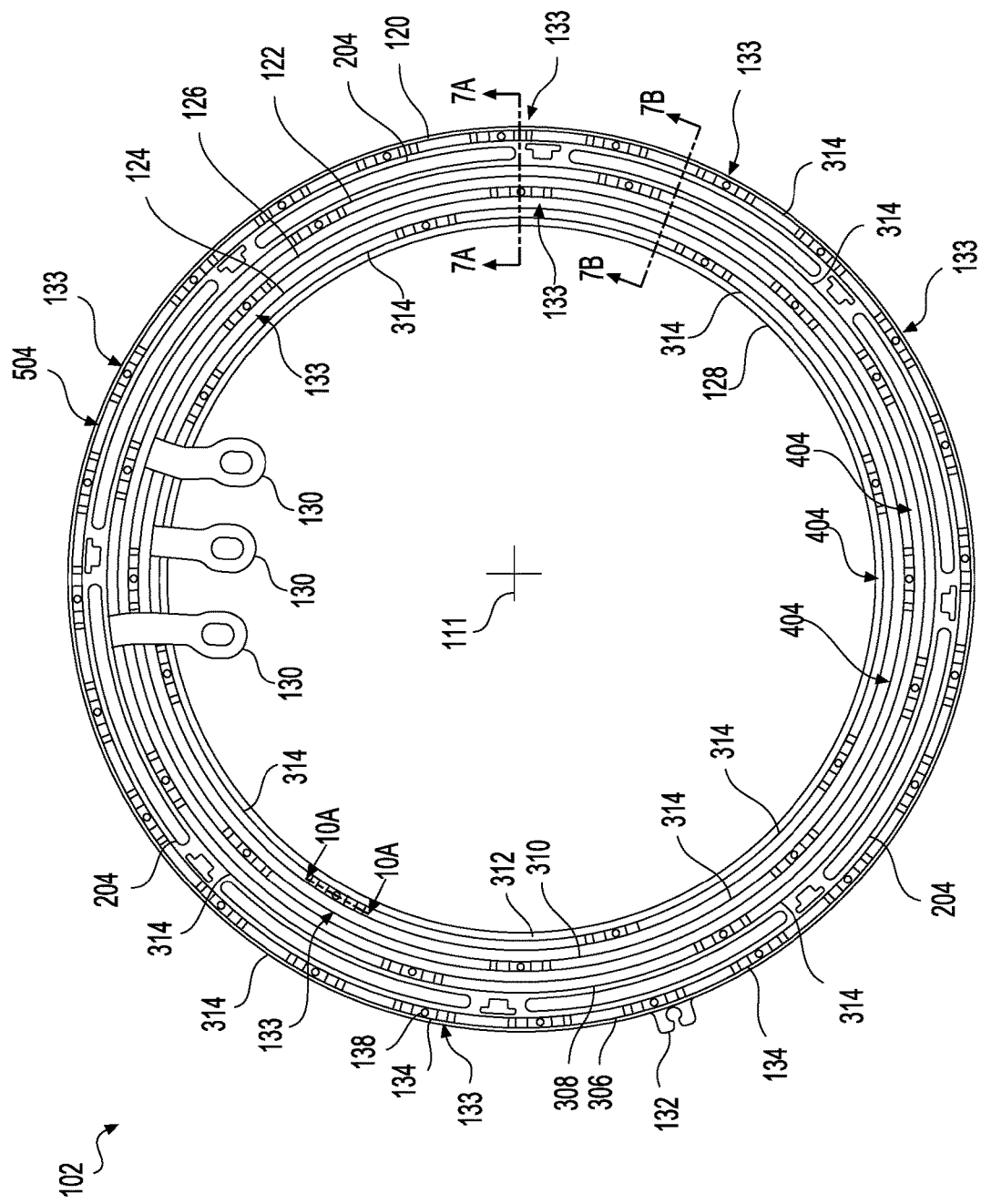
FIG. 6 illustrates a plan view of the power connecting apparatus prior to performing the overmolding operation according to some implementations.

FIG. 6 illustrates a plan view of the power connecting apparatus 102 prior to performing the overmolding operation according to some implementations. In this example, the power connecting apparatus 102 includes the connecting rings 120-126 arranged concentrically in the carrier ring 128. As mentioned above, the connecting rings 122, 124, and 126 may correspond to the U-phase, V-phase, and W-phase power, respectively, and the N connecting ring 120 may correspond to a neutral point of a star connection. The connecting rings 120-126 are each in the form of a circular ring and each include a plurality of stator coil connection terminal sections 133, e.g., 8 terminal sections 133 each for the connecting rings 122-126 and 24 terminal sections 133 for the N connecting ring 120 in this example. As mentioned above, each terminal section 133 may include a raised portion 134 including a through-hole 138 for receiving one of the wire ends of one of the stator coils 112.

The connecting rings 120-126 may each include a single conductor (i.e., a linear conductor, such as a wire with a rectangular cross section) having non-raised lower portions 314 located between the raised portions 134. The lower portions 314 may located entirely within respective grooves 306, 308, 310 and 312 formed in the carrier ring 128. The through-hole 138 at each terminal section 133 aligns with a respective wire-receiving opening (not visible in FIG. 6) formed through the underside of the carrier ring 128, and through which the wire ends of the stator coils 112 (not shown in FIG. 6) are to be inserted. In the illustrated example, the connecting rings 120-126 are arranged in the circular carrier ring 128 in a concentric fashion with the N connecting ring 120 having the largest diameter, the V-phase connecting ring 124 having the smallest diameter, and the U-phase connecting ring 122 and the W-phase connecting ring 126 having diameters between the diameters of the connecting rings 120 and 126 in the radial direction away from the central axis 111.

The stator-wire-receiving terminal sections 133 of the connecting rings 122-126 are arranged staggered in a circumferential direction so that they are not adjacent to each other. For example, the terminal sections 133 of the connecting rings 122-126 are arranged such that they do not substantially align in a radial direction. That is, the terminal sections 133 are arranged in a fashion such that assuming an imaginary line in the radial direction passes through any one terminal of one phase, another terminal of different phase is offset from the imaginary line in the circumferential direction to achieve a predetermined distance between the two terminals of the connecting rings for different phases.

The connecting rings 120-126 are positioned for aligning with the wire ends of the respective stator coils 112, e.g., as discussed above with respect to FIG. 1 and as discussed additionally below with respect to FIG. 13. In some examples, the carrier ring 128 may be molded around the connecting rings 120-126, such as by insert molding or any other suitable technique. Alternatively, the connecting rings 120-126 may be inserted into the respective grooves 306-312 in the carrier ring 128 following fabrication of the carrier ring 128 by various molding techniques.

In the example, of FIG. 6, a first cross section of the assembly corresponding to FIG. 7A is taken along line 7A-7A. Further, a second cross section of the assembly corresponding to FIG. 7B is taken along line 7B-7B. In addition, a third cross section of a terminal section corresponding to FIG. 10A is taken along line 10A-10A.

FIG. 7A illustrates an example cross-sectional view of the power connecting apparatus 102 prior to performing the overmolding operation, as taken along line 7A-7A of FIG. 6, according to some implementations. In this example, the cross-sectional view illustrates a cross-section of the carrier ring 128 including the grooves 306-312 having the connecting rings 120-126 disposed in respective ones of the grooves 306-312. For example, the connecting rings 122 and 126 are shown in cross-section at the lower portion 314 of the respective rings 122 and 126, illustrating that the top surfaces 315 of these rings 122 and 126 are below the upper surface 316 of the carrier ring 128.

In addition, connecting rings 120 and 124 are shown in cross section at the raised portions 134 of the connecting rings 120 and 124, corresponding to respective terminal sections 133 of the connecting rings 120 and 124. For example, the cross-section of the raised portion 134 of connecting ring 124 shows the through-hole 138 having a conical or otherwise tapered configuration, and further shows the cylindrical protrusion 320 having an opening coextensive with the through-hole 138. Furthermore, the carrier ring 128 at this location includes a wire-end-receiving opening 702 that is in line with the through-hole 138 to enable insertion of a coil wire end through the bottom 704 of the carrier ring 128 and into the through-hole 138 of the terminal section 133 of the connecting ring 124.

FIG. 7B illustrates an example cross-sectional view of the power connecting apparatus 102 prior to performing the overmolding operation, as taken along line 7B-7B of FIG. 6, according to some implementations. In this example, the cross-section is taken through a location on the power connecting apparatus 102 that does not include any raised portions 134 of the connecting rings 120-126. Accordingly, all of the lower portions 314 of the connecting rings 120-126 are shown within the grooves 306-312 such that the top surface 315 of each connecting ring 120-126 is below the upper surface 316 of the carrier ring 128. As a nonlimiting example, the top surface 315 of the respective connecting rings 120-126 may be between one half and five millimeters below the upper surface 316 of the carrier ring 128.

Figure 8:
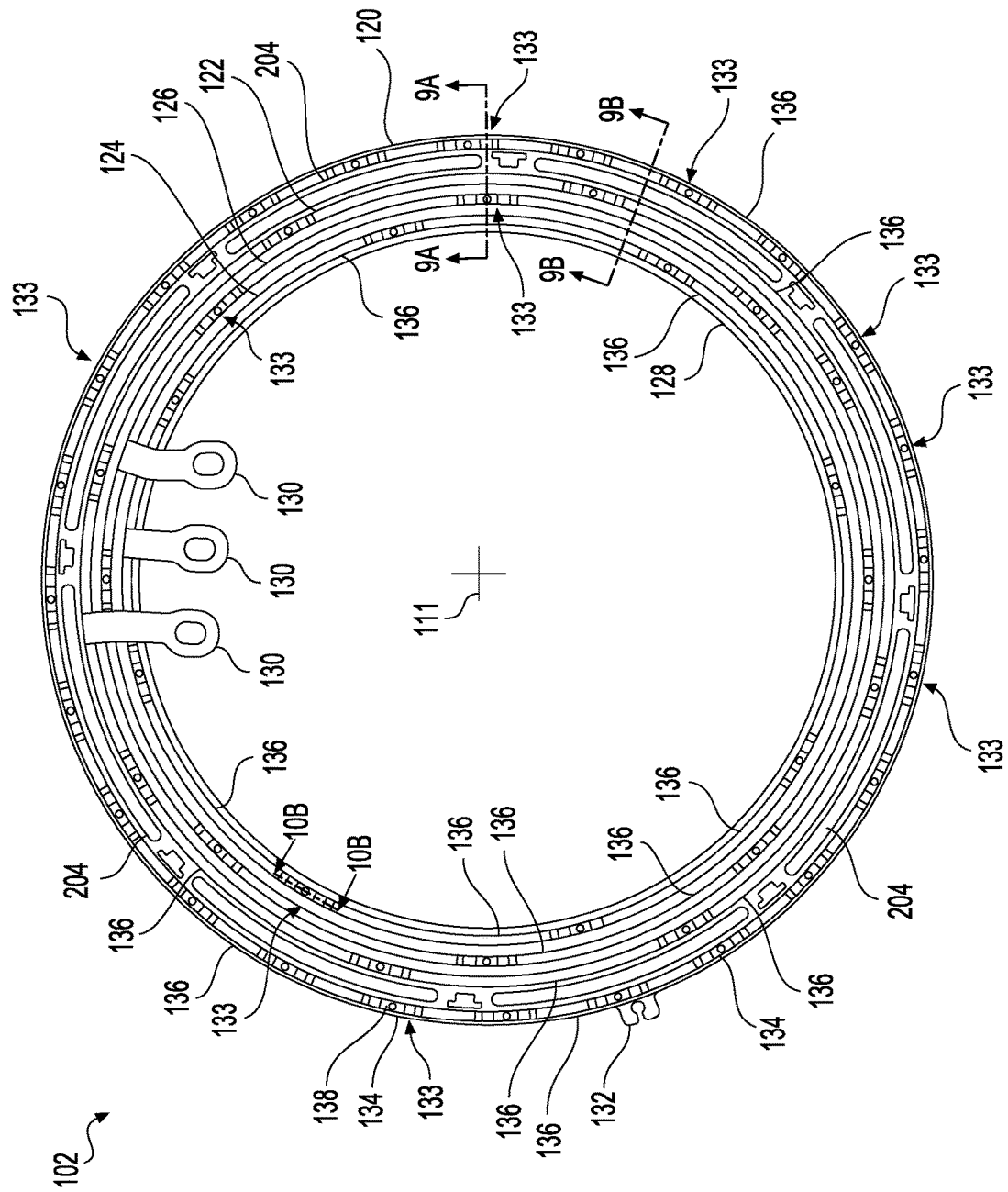
FIG. 8 illustrates a plan view of the power connecting apparatus after the overmolding operation has been performed according to some implementations.

FIG. 8 illustrates a plan view of the power connecting apparatus 102 after the overmolding operation has been performed according to some implementations. In this example, the power connecting apparatus 102 includes the connecting rings 120-126 arranged concentrically in the annular carrier ring 128. As mentioned above, the connecting rings 122, 124, and 126 may correspond to the U-phase, V-phase, and W-phase power, respectively, and the N connecting ring 120 may correspond to a neutral point of a star connection. The connecting rings 120-126 are each in the form of a circular ring and each include a plurality of stator coil connection terminal sections 133. As mentioned above, each terminal section 133 may include a raised portion 134 including a through-hole 138 for receiving one of the wire ends of one of the stator coils 112. Further, the stator-wire-receiving terminal sections 133 of the connecting rings 122-126 are arranged staggered in a circumferential direction so that they are not adjacent to each other. In this example, the grooves 306-312 within which the respective connecting rings 120-126 are disposed, have been overmolded with insulating members 136. As mentioned above, the insulating material used for insulating members 136 may be an insulative thermoplastic or any of various other suitable materials that may be molded in a plastic state and subsequently hardened to a relatively less plastic state so as to be able to maintain the connecting rings 120-126 in their respective grooves 306-312 Furthermore, following the overmolding, the raised portions 134 of the respective rings 120-126 including the terminal sections 133 may remain physically and electrically exposed from the insulating members 136 to enable a welding, brazing, or soldering operation and/or various other operations for fastening the coil wire ends to the terminal sections 133.

In the example, of FIG. 8, a first cross section of the assembly corresponding to FIG. 9A is taken along line 9A-9A. Further, a second cross section of the assembly corresponding to FIG. 9B is taken along line 9B-9B. In addition, a third cross section of a terminal section corresponding to FIG. 10B is taken along line 10B-10B.

FIG. 9A illustrates an example cross-sectional view of the power connecting apparatus 102 following the overmolding operation, as taken along line 9A-9A of FIG. 8, according to some implementations. The cross-sectional view of FIG. 9A may correspond to the cross-sectional view of FIG. 7A in some examples. In this example, the cross-sectional view illustrates a cross-section of the carrier ring 128 in which the grooves 306-312 having the connecting rings 120-126 disposed therein have been filled with the overmolded insulating material of the insulating members 136.

FIG. 9B illustrates an example cross-sectional view of the power connecting apparatus 102 following the overmolding operation, as taken along line 9B-9B of FIG. 8, according to some implementations. In this example, the cross-section is taken through a location on the power connecting apparatus 102 that does not include any raised portions 134 of the connecting rings 120-126. The cross-sectional view of FIG. 9B may correspond to the cross-sectional view of FIG. 7B in some examples. In this example, the cross-sectional view illustrates a cross-section of the carrier ring 128 in which the grooves 306-312 having the connecting rings 120-126 disposed therein have been filled with the overmolded insulating material of the insulating members 136.

FIG. 10A illustrates an example cross-sectional view of a terminal section 133 of the power connecting apparatus 102 prior to performing the overmolding operation, as taken along line 10A-10A of FIG. 6, according to some implementations. In this example, the cross-sectional view illustrates a cross-section of the terminal section 133 showing the raised portion 134 including a first bend portion 1002 and a second bend portion 1004 that together serve to raise the terminal section 133 in an axial direction of the main axis 111 (e.g., in a direction of insertion of the wire end of the stator coil) above a remaining lower portion 314 of the connecting ring, and generally equal to or above the upper surface 316 of the carrier ring 128. This example further illustrates the wire-end-receiving opening 702 that is in line with the through-hole 138 to enable insertion of a coil wire end through the bottom 704 of the carrier ring 128 and into the through-hole 138 of the terminal section 133 of the connecting ring 124.

FIG. 10B illustrates an example cross-sectional view of a terminal section 133 of the power connecting apparatus 102 following the overmolding operation, as taken along line 10B-10B of FIG. 8, according to some implementations. In this example, the cross-sectional view illustrates a cross-section of the terminal section 133 showing the raised portion 134 including a first bend portion 1002 and a second bend portion 1004 that together serve to raise the terminal section 133 in an axial direction of the main axis 111 above a remaining lower portion 314 of the connecting ring and to a level generally equal to or above the upper surface 316 of the carrier ring 128. For example, the bend portions 1002 and 1004 obliquely raise the raised portion 134 to enable the insulating members 136 to form a seal with the raised portion 134 of the connecting ring, e.g., at 1006 and 1008 on either side of the raised portion 134, while leaving the raised portion 134 with the terminal section exposed.

In addition, although not illustrated in FIG. 8, this example further illustrates insertion of a coil wire end 1006 of a coil 112 through the opening 702 in the bottom side 704 of the carrier ring 128 and into the through-hole 138 of the terminal section 133 of the connecting ring. For example, a distal end of the wire end 1006 may extend beyond the cylindrical protrusion 320 of the terminal section 133. As one example, the cylindrical protrusion 320 may be crimped around the wire end 1006 and the wire end 1006 may be trimmed to be approximately adjacent to the top of the cylindrical protrusion 320. Welding, soldering, brazing, or other techniques may be used to secure the wire end 1010 to the terminal section 133, thereby securing the wire end 1010 within the through-hole 138.

Figure 11:
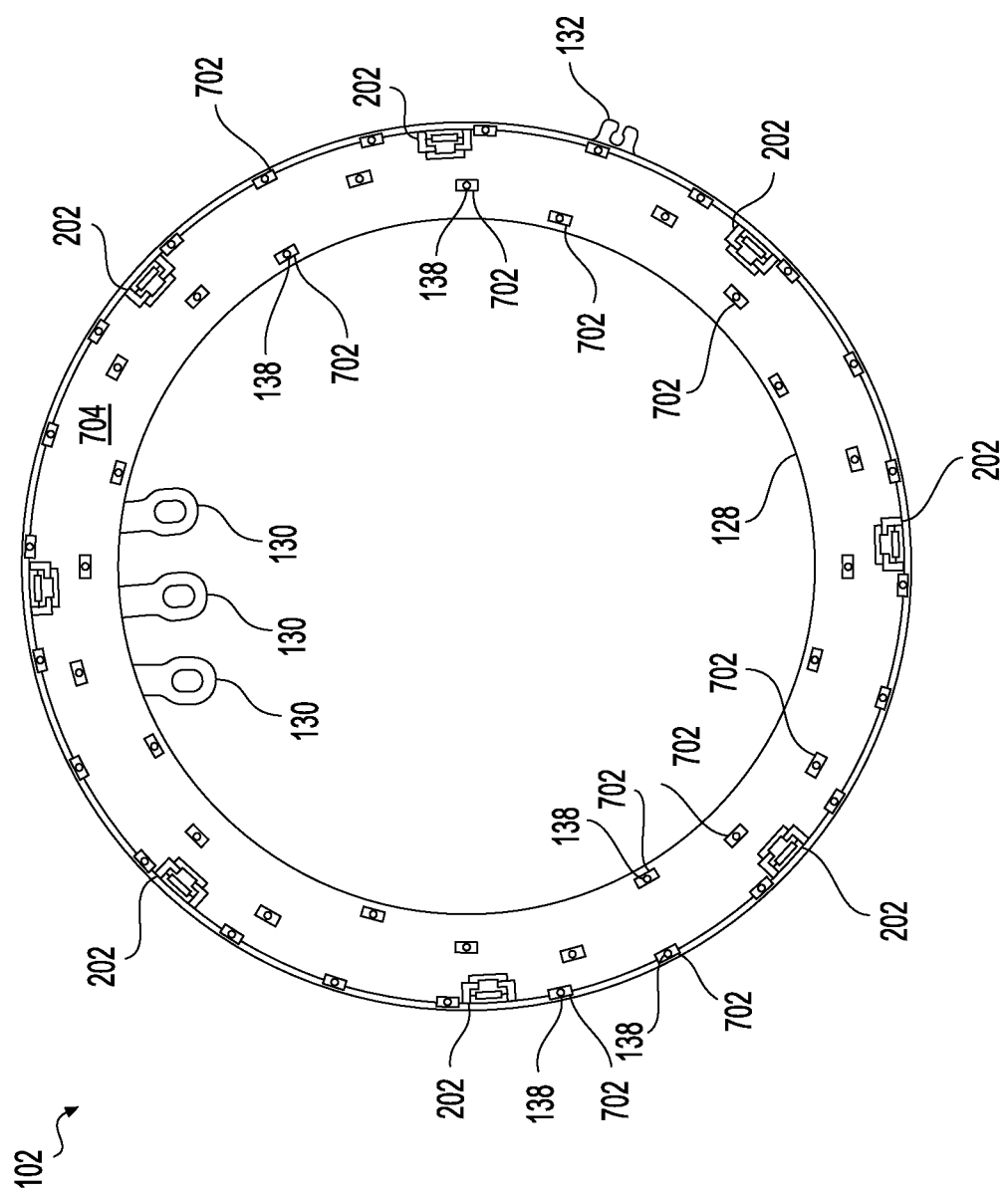
FIG. 11 illustrates a plan view of the bottom side of the power conducting apparatus according to some implementations.

FIG. 11 illustrates a plan view of the bottom side 704 of the power conducting apparatus 102 according to some implementations. In this example a plurality of the opening 702 are formed in the bottom side 704 of the carrier ring 128 to enable insertion of the wire ends 1010 of the stator coils 112 into the through-holes 138 of the terminal sections 133. For example, there may be a respective opening 702 in the bottom 704 of the carrier ring aligned with each respective one of the terminal sections 133 in each of the connecting rings 120-126.

Figure 12:
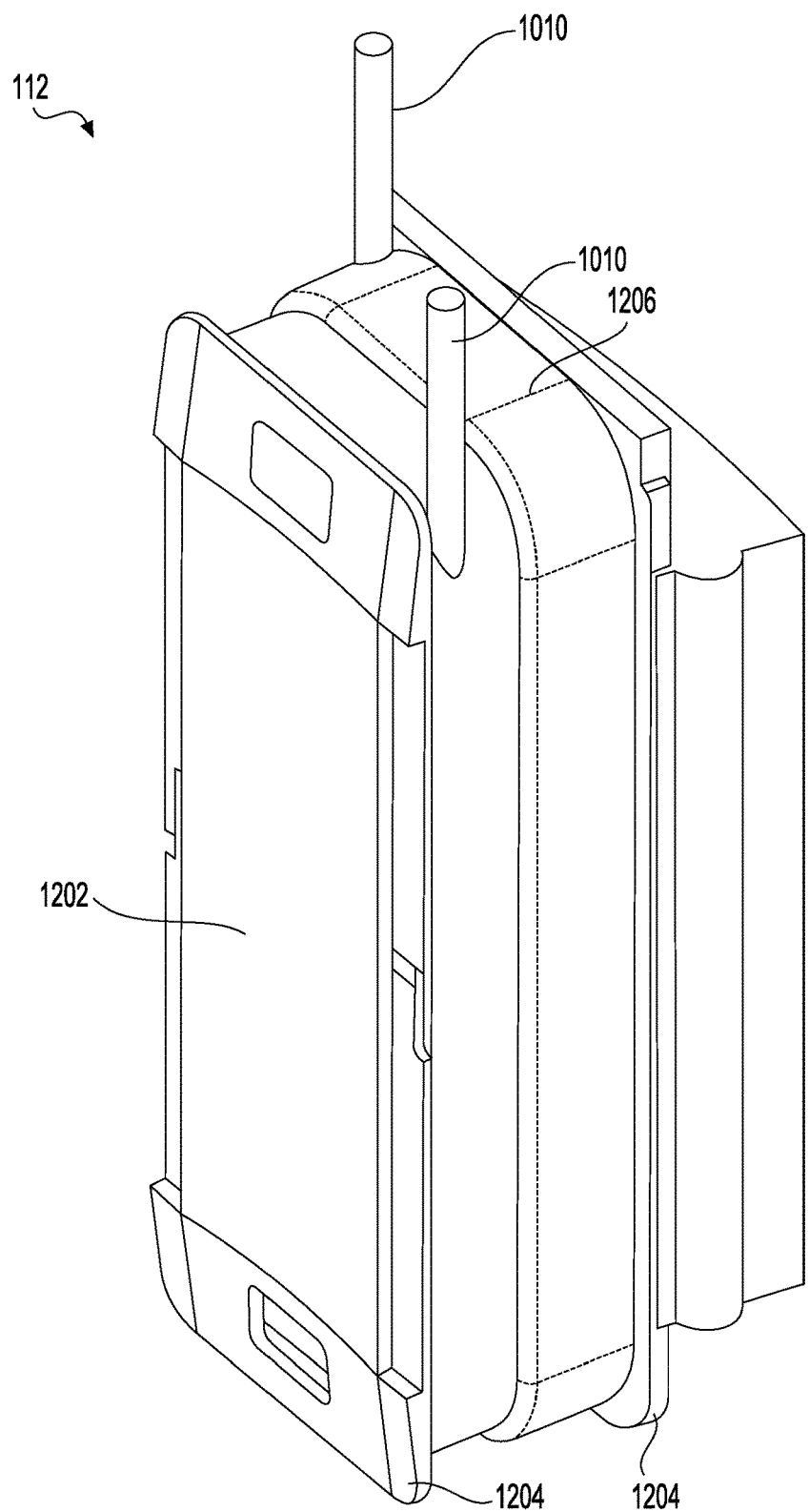
FIG. 12 illustrates a perspective view of an individual stator coil according to some implementations.

FIG. 12 illustrates a perspective view of an individual stator coil 112 according to some implementations. The stator coil 112 includes a core section 1202 that protrudes inward in the radial direction when the stator coil 112 is mounted in the stator housing 106 as discussed above with respect to FIG. 1. A conductor with an insulation coating (e.g., an enameled wire or the like) is wound around the core section 1202 via a bobbin 1204 made of an insulating material to form a wire coil 1206. The conductor may be of any suitable shape in cross section, such as circular, oval, rectangular, triangular, and so forth, as will be apparent to those of skill in the art having the benefit of the disclosure herein.

FIG. 12 illustrates the appearance of the wire coil 1206 after winding. The coil wire ends 1010 at the start and the end of the coil winding extend upward from the stator coil 112 and the insulation coating may be removed from the wire ends 1010. Accordingly, the wire ends 1010 extend upward in a direction generally parallel to the axis of rotation 111 of the stator 100 discussed above. As mentioned above, the first wire end 1010 may engage with a terminal of the N connecting ring 120 as a neutral point, and a second wire end 1010 may engage with one of the terminal sections 133 of one of the phase power connecting rings 122, 124, or 126, which serve as wire connections for U-phase, V-phase, W-phase power, respectively, e.g., as discussed above with respect to FIG. 1.

Figure 13:
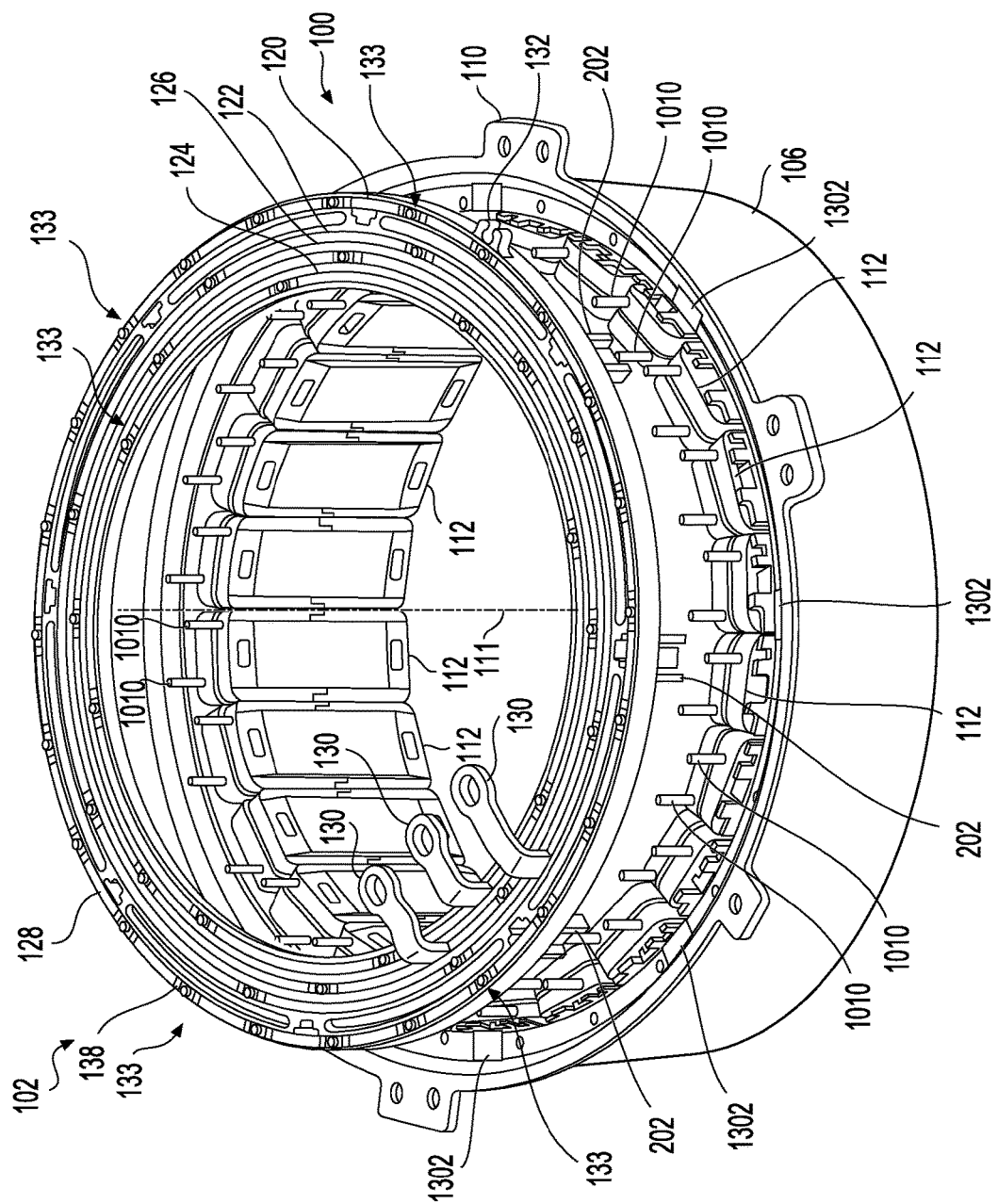
FIG. 13 illustrates an exploded perspective view of the power connecting apparatus and the stator according to some implementations.

FIG. 13 illustrates an exploded perspective view 1300 of the power connecting apparatus 102 and the stator 100 according to some implementations. In the illustrated example, the power connecting apparatus 102 is shown prior to installation onto the stator 100. As mentioned above, the stator 100 includes a plurality of stator coils 112 arranged in a circular configuration within the cylindrical housing 106. As described additionally above with respect to FIG. 12, the stator coils 112 may each include a length of a conductor, such as a wire, wound multiple times around a core to provide an electromagnetic effect when electric current passes through the wire. The wire may be insulated, such as with an enamel coating or other suitable insulator, to prevent short-circuiting between the windings within the stator coil. The plurality of stator coils 112 may be pressed, shrunk fit, or otherwise adhered to the stator housing 106 to form the stator 100 as a hollow cylinder.

The stator coils 112 are arranged peripherally within the housing 106 such that the wire ends 1010 of each of the respective stator coils 112 extend upward in a direction parallel to the axis of rotation 111 of the rotary electric machine. The insulation coating is removed from the wire ends 1010 so that an electrical connection can be established between the wire ends 1010 and select pairs of the connecting rings 120-126. For example, a first wire end 1010 of each stator coil 112 may be positioned to contact the N connecting ring 120 when the power connecting apparatus 102 is installed on the stator 100. Furthermore, a second wire end 1010 may be positioned to contact one of the phase power connecting rings, i.e., one of the U connecting ring 122, the V connecting ring 124, or the W connecting ring 126.

The power connecting apparatus 102 formed as an annular ring may be assembled to the stator 100 by insertion of the wire ends 1010 of the plurality of stator coils 112 into the openings 702 (not shown in FIG. 13) in the carrier ring 128 and the through-holes 138 in a single assembly step, so that the stator coils 112 are connected to the correct intended phase, and also connected to the neutral points in common. The terminal sections 133 to which the wire ends 1010 of the stator coils 112 of the different phases are connected are staggered in the circumferential direction approximately by the width of one stator coil 112 so that the terminal sections 133 are not adjacent in the circumferential direction between the different phases. As a result, the distance of insulation is relatively large, thus increasing the quality of insulation. Furthermore, as discussed above, the non-raised connecting ring portions excluding the terminal section 133 are overmolded with the insulation material to form the insulating members 136. As a result, a sufficient insulation distance can be secured between adjacent connecting rings. This prevents occurrences of shortage between the phases and of insulation failure due to partial discharge.

The carrier ring 128 may include a plurality of the alignment tabs 202 extending downward for enabling proper alignment of the power connecting apparatus 102 during assembly to the stator 100. For example, the alignment tabs 202 may be inserted into corresponding mating holes 1302 located in the housing 106 around the perimeter of the stator coils 112.

From the foregoing, it may be seen that the power connecting apparatus 102 provides a plurality of connecting rings arranged substantially in a concentric fashion in the same plane, so that there is no overlap of the connecting rings in the axial direction of the rotary electric machine. Accordingly, the power connecting apparatus 102 can be made compact in the direction of the axis 111 of the rotary electric machine. Further, the power connecting apparatus 102 can be constructed to have a height generally not much higher than that of a single connecting ring, so that the space on the end face of the stator 100 in the axial direction thereof can be minimized and the size of the rotary electric machine in the axial direction thereof can also be minimized.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A stator for a rotary electric machine, the stator comprising:
   a plurality of stator coils arranged around a central axis;
   a connecting ring including a first portion having a hole for receiving a wire end of one of the plurality of stator coils by insertion on a first side, the first portion including a protrusion extending away from the hole on a second side, the connecting ring including bends for raising the first portion relative to a second portion of the connecting ring in a direction of the protrusion; and
   an insulating member covering the second portion of the connecting ring with the first portion of the connecting ring exposed from the insulating member, wherein the insulating member is an overmolded member that is disposed overlying the second portion of the connecting ring, with the first portion of the connecting ring including the hole and the protrusion exposed from the overmolded member.

2. The stator as recited in claim 1, wherein the bends raise the first portion obliquely relative to the second portion of the connecting ring to form a seal with the insulating member on at least one side of the first portion.

3. The stator as recited in claim 1, wherein:
   the protrusion is a cylindrical protrusion having an opening coextensive with the hole; and
   the wire end of the one of the stator coils extends through the hole and into the opening of the protrusion.

4. The stator as recited in claim 1, further comprising a carrier ring supporting the connecting ring, wherein the carrier ring is constructed of a non-conductive material.

5. The stator as recited in claim 1, wherein:
   the carrier ring includes a circular shaped groove;
   the connecting ring is arranged on the groove of the carrier ring;
   the second portion of the connecting ring is disposed in the groove; and
   the insulating member is disposed in the groove overlying the second portion to cover the second portion.

6. A power distribution apparatus for a rotary electric machine, the apparatus comprising:
   at least one connecting ring that connects stator coils of a same phase, the at least one connecting ring including at least one linear conductor integrally formed in a ring-like shape;
   the at least one connecting ring including a terminal section integrally formed in the linear conductor, the terminal section including a hole configured to receive a wire end of one of the stator coils to be inserted into the hole in an insertion direction;
   the at least one connecting ring including a cylindrical protrusion having an opening in communication with the hole, the cylindrical protrusion protruding away from the hole in the insertion direction, the opening configured to receive the wire end of the one of the stator coils;
   a carrier ring, wherein the connecting ring is arranged on the carrier ring, and at least a first portion of the connecting ring including the terminal section is raised in the insertion direction relative to a second portion of the connecting ring; and
   an insulating member that covers the second portion, wherein the insulating member is an overmolded member that is disposed overlying the second portion of the connecting ring, with the first portion of the connecting ring including the terminal section exposed from the overmolded member.

7. The power distribution apparatus as recited in claim 6, wherein the connecting ring includes bends for raising the first portion in the insertion direction relative to the second portion of the connecting ring.

8. The power distribution apparatus as recited in claim 7, wherein the bends raise the first portion obliquely relative to the second portion of the connecting ring to form a seal with the insulating member on at least one side of the first portion.

9. The power distribution apparatus as recited in claim 6, wherein:
   the carrier ring includes a circular shaped groove;
   the connecting ring is arranged on the groove of the carrier ring;
   the second portion of the connecting ring is disposed in the groove; and
   the insulating member is disposed in the groove overlying the second portion to cover the second portion.

10. The power distribution apparatus as recited in claim 6, wherein the carrier ring includes a respective opening aligned with the hole to allow insertion of the wire end through the opening and into the hole.

11. The power distribution apparatus as recited in claim 6, wherein there are a plurality of the connecting rings including three phase power connecting rings and a neutral connecting ring disposed concentrically on the carrier ring.

12. A power distribution apparatus comprising:
   a connecting ring that connects to a stator coil, the connecting ring including at least one linear conductor integrally formed in a ring-like shape;
   the connecting ring including a terminal section integrally formed in the linear conductor, the terminal section including a hole configured to receive a wire end of the stator coil inserted into the hole in an insertion direction;
   the connecting ring including a cylindrical protrusion having an opening in communication with the hole, the cylindrical protrusion protruding away from the hole in the insertion direction;
   the connecting ring including bends for raising a first portion of the connecting ring including the terminal section in the insertion direction relative to a second portion of the connecting ring; and
   an insulating member that covers the second portion, wherein the insulating member is an overmolded member that is disposed overlying the second portion of the connecting ring, with the first portion of the connecting ring including the terminal section exposed from the overmolded member.

13. The power distribution apparatus as recited in claim 12, wherein the bends raise the first portion obliquely relative to the second portion of the connecting ring to form a seal with the insulating member on at least one side of the first portion.

14. The power distribution apparatus as recited in claim 12, further comprising a carrier ring, wherein the connecting ring is arranged on the carrier ring.

15. The power distribution apparatus as recited in claim 12, wherein:
 the carrier ring includes a circular shaped groove;
 the connecting ring is arranged on the groove of the carrier ring;
 the second portion of the connecting ring is disposed in the groove; and
 the insulating member is disposed in the groove overlying the second portion to cover the second portion.

16. The power distribution apparatus as recited in claim 12, wherein there are a plurality of the connecting rings arranged concentrically on the carrier ring.

17. The power distribution apparatus as recited in claim 16, wherein:
 there are a plurality of the stator coils; and
 the plurality of the connecting rings includes three phase power connecting rings and a neutral connecting ring, each connected to multiple ones of the stator coils.

\* \* \* \* \*